(12) United States Patent
Huang et al.

(10) Patent No.: US 12,448,360 B2
(45) Date of Patent: Oct. 21, 2025

(54) SYNTHESIS METHOD FOR PREPARING SGLT INHIBITOR INTERMEDIATE

(71) Applicant: Daewoong Pharmaceutical Co., Ltd., Hwaseong-si (KR)

(72) Inventors: Zhining Huang, Guangdong (CN); Weiping Ye, Guangdong (CN); Zhangtao Zhou, Guangdong (CN); Junjing Wang, Guangdong (CN); Heekyoon Yoon, Cheongju-si (KR); Ji-Soo Choi, Seoul (KR)

(73) Assignee: DAEWOONG PHARMACEUTICAL CO., LTD., Hwaseong-si (KR)

( * ) Notice: Subject to any disclaimer, the term of this patent is extended or adjusted under 35 U.S.C. 154(b) by 473 days.

(21) Appl. No.: 18/025,579

(22) PCT Filed: Sep. 10, 2020

(86) PCT No.: PCT/CN2020/114471
§ 371 (c)(1),
(2) Date: Mar. 9, 2023

(87) PCT Pub. No.: WO2022/051980
PCT Pub. Date: Mar. 17, 2022

(65) Prior Publication Data
US 2023/0322699 A1   Oct. 12, 2023

(51) Int. Cl.
*C07D 307/79*   (2006.01)
(52) U.S. Cl.
CPC .................................. *C07D 307/79* (2013.01)
(58) Field of Classification Search
CPC .................................................... C07D 307/79
See application file for complete search history.

(56) References Cited

U.S. PATENT DOCUMENTS

| 9,034,921 B2 | 5/2015 | Choi et al. |
| 10,640,496 B2 | 5/2020 | Yoon et al. |
| 2014/0274918 A1 | 9/2014 | Choi et al. |

FOREIGN PATENT DOCUMENTS

| CN | 103596564 B | 5/2016 |
| CN | 109311861 A | 2/2019 |
| CN | 112094253 A | 12/2020 |

OTHER PUBLICATIONS

International Search Report issued May 26, 2021 in PCT/CN2020/114471 (English translation only).

*Primary Examiner* — Alicia L Otton
(74) *Attorney, Agent, or Firm* — Panitch Schwarze Belisario & Nadel LLP

(57) ABSTRACT

A method for preparing compound 1 and compound 2 having a structure as shown below, the method includes the following steps:

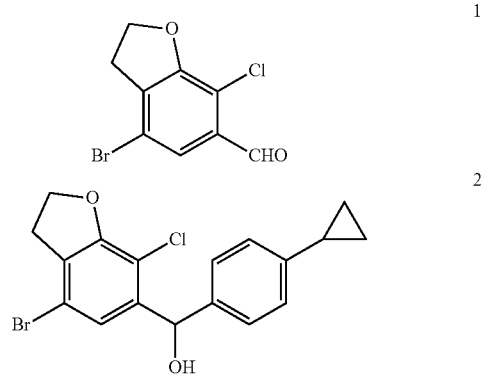

1) subjecting 2,3-dihydrobenzofuran-7-amine as a raw material to a selective-dibromination with a brominating reagent to obtain 4,6-dibromo-2,3-dihydrobenzofuran-7-amine;
2) subjecting 4,6-dibromo-2,3-dihydrobenzofuran-7-amine obtained in the step 1) to Sandmeyer reaction for chlorination to obtain 4,6-dibromo-7-chloro-2,3-dihydrobenzofuran;
3-1) selectively debrominating from 4,6-dibromo-7-chloro-2,3-dihydrobenzofuran obtained in the step 2) using a strong base, and then adding a formylation reagent to obtain compound 1;
3-2) selectively debrominating from 4,6-dibromo-7-chloro-2,3-dihydrobenzofuran obtained in the step 2) using a strong base, and then reacting with 4-cyclopropyl benzaldehyde to obtain compound 2.

11 Claims, No Drawings

SYNTHESIS METHOD FOR PREPARING SGLT INHIBITOR INTERMEDIATE

CROSS-REFERENCE TO RELATED APPLICATIONS

This application is a Section 371 of International Application No. PCT/CN2020/114471, filed Sep. 10, 2020, which was published in the Chinese language on Mar. 17, 2022 under International Publication No. WO 2022/051980 A1, the disclosure of which is incorporated herein by reference in its entirety.

TECHNICAL FIELD

The present invention belongs to the field of organic chemical synthesis of pharmaceutical intermediates, in particular to a method for synthesizing SGLT inhibitors by using self-designed and innovative intermediates.

BACKGROUND OF THE INVENTION

Diabetes is one of the major diseases challenging human health in the 21st century. In 2019, it is estimated that 116 million adults in China suffer with diabetes and the patients may also be at risk of developing life-threatening complications. Of the estimated 116 million population, more than 65 million population are undiagnosed and thus being at extremely high risk. It is estimated that 463 million adults suffer with diabetes worldwide, and among them there is 163 million population in areas of the Western Pacific alone.

Sodium-glucose co-transporter (SGLT) inhibitors are a new class of oral drugs for diabetic treatment which exert hypoglycemic effects by increasing the excretion of glucose into the urine.

U.S. Patent Publication No. 2015/0152075 discloses diphenylmethane derivative compounds with inhibitory activity against SGLT, which is effective in the treatment of diabetes and significantly reduces excretion of urinary glucose in animals compared to the star drug Dapagliflozin.

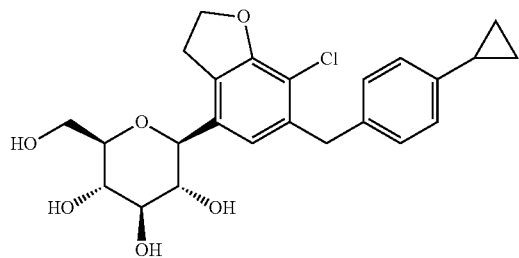 [SMILES: OC[C@H]1O[C@@H](c2cc(Cc3ccc(C4CC4)cc3)c(Cl)c3c2CCO3)[C@H](O)[C@@H](O)[C@@H]1O]

Structural formula of diphenylmethane derivatives disclosed in the literature Chinese patent CN109311861A discloses a method for preparing the above compound and its key intermediates by the route as shown below.

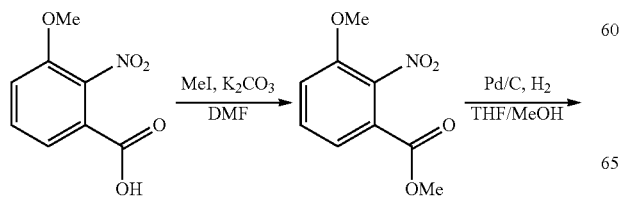

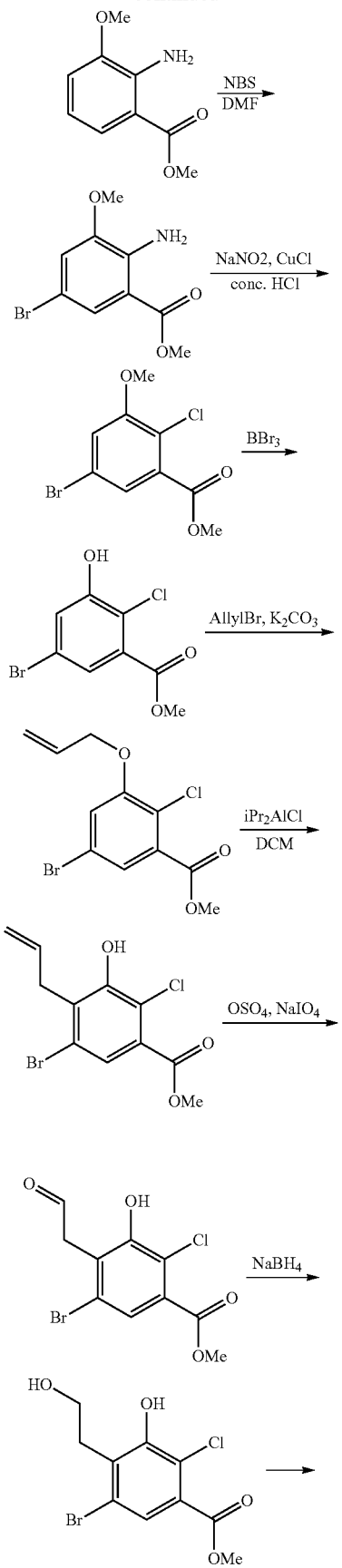

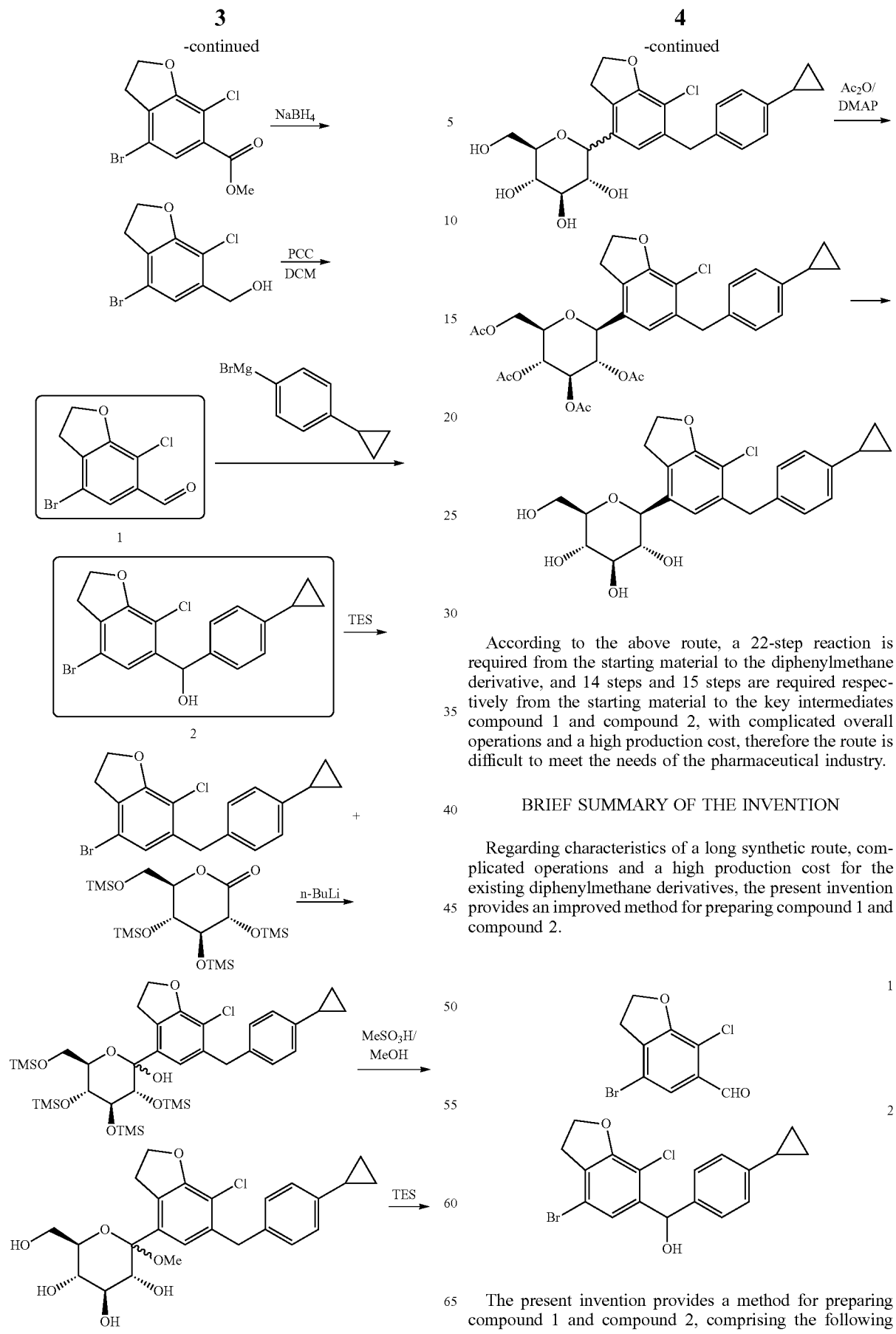

According to the above route, a 22-step reaction is required from the starting material to the diphenylmethane derivative, and 14 steps and 15 steps are required respectively from the starting material to the key intermediates compound 1 and compound 2, with complicated overall operations and a high production cost, therefore the route is difficult to meet the needs of the pharmaceutical industry.

BRIEF SUMMARY OF THE INVENTION

Regarding characteristics of a long synthetic route, complicated operations and a high production cost for the existing diphenylmethane derivatives, the present invention provides an improved method for preparing compound 1 and compound 2.

The present invention provides a method for preparing compound 1 and compound 2, comprising the following steps.

Compound 1:
  step 1-1. taking 2,3-dihydrobenzofuran-7-amine as a raw material, and carrying out selective dibromination by using a bromination reagent to obtain 4,6-dibromo-2,3-dihydrobenzofuran-7-amine;
  step 1-2. subjecting the 4,6-dibromo-2,3-dihydrobenzofuran-7-amine to a Sandmeyer reaction for chlorination to obtain 4,6-dibromo-7-chloro-2,3-dihydrobenzofuran;
  step 1-3. selectively removing bromine from the 4,6-dibromo-7-chloro-2,3-dihydrobenzofuran by selectively using a strong base, followed by adding a formylation reagent to obtain the compound 1.

The synthetic route is as follows.

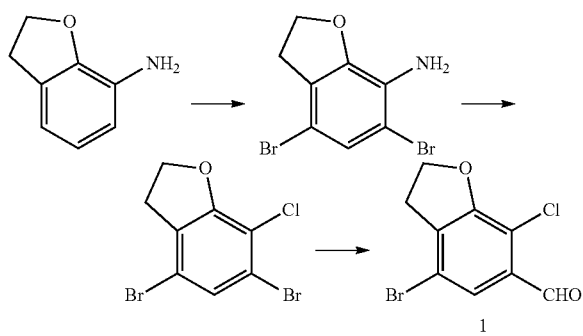

Compound 2:
  step 2-1. selectively removing bromine from the 4,6-dibromo-7-chloro-2,3-dihydrobenzofuran by using a strong base, followed by reacting with 4-cyclopropyl benzaldehyde to obtain the compound 2.

The synthetic route is as follows.

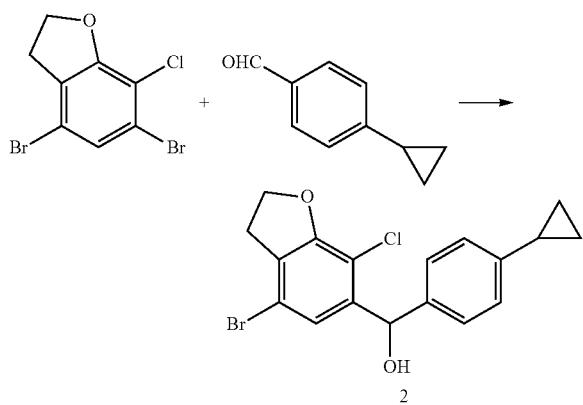

In which, in step 1-1, the bromination reagent comprises one of bromine, N-bromosuccinimide (NBS), dibromohydantoin, preferably N-bromosuccinimide.

Further, in step 1-2, a reagent used in the Sandmeyer reaction comprises one of a system of hydrochloric acid, sodium nitrite and cuprous chloride, a system of isoamyl nitrite and cupric chloride, and a system of tert-butyl nitrite and cupric chloride.

Further, in step 1-3, the strong base comprises one or two of n-butyl lithium, tert-butyl lithium and isopropyl magnesium chloride, preferably isopropyl magnesium chloride. The isopropyl magnesium chloride is preferred due to its high safety.

Further, in step 1-3, the formylation reagent comprises one of N, N-dimethylformamide, N-formylmorpholine, ethyl formate, preferably N, N-dimethylformamide.

Further, in step 2-1, the strong base comprises one or two of n-butyl lithium, tert-butyl lithium, isopropyl magnesium chloride, preferably isopropyl magnesium chloride.

Compared to the existing synthetic routes, the present invention has the following advantages:
  1. The route for preparing compound 1 and compound 2 of the present invention obtains a total yield of more than 50% and has characteristics of a short route, relatively mild reaction conditions or the like.
  2. The synthetic route proposed in the present invention uses easily available raw materials and has a low cost, no special operations for process and low requirements for equipment, and thus is suitable for large-scale industrial production.

DETAILED DESCRIPTION OF THE EMBODIMENTS

Preferred embodiments of the present invention are described in detail below so as to make those skilled in the art to understand the advantages and features of the present invention more easily and thus to define the protection scope of the present invention more clearly.

Example 1: Synthesis of 4,6-dibromo-2,3-dihydrobenzofuran-7-amine

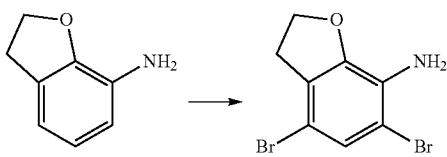 [SMILES: Nc1cccc2c1OCC2 ; Nc1c(Br)cc(Br)c2c1OCC2]

8.7 g of 2,3-dihydrobenzofuran-7-amine and 200 mL of ethyl acetate were added to a 1000 mL of reaction flask, and then 41.4 g of bromine was added dropwise at a controlled temperature between 10° C. to 20° C., in which the addition amount of bromine was optimized via experiments. If too little bromine is added, the reaction will be incomplete; and if too much bromine is added, the system will become complicated and generate increased by-products. The reaction temperature was controlled mainly for the prevention of the increase of by-products. After the completion of the dropwise addition, the system was filtered. The filter cake was added to a mixture solvent of 100 mL water and 100 mL ethyl acetate, followed by dropwise adding 10% sodium hydroxide solution to adjust the pH to a value between 8 to 10. In which, the system is acidic after the reaction and some products forms salts. The pH was adjusted to the value of 8 to 10 for freeing of salts. If the pH is too low, the freeing of salts is incomplete; and if the pH is too high, more alkali will be consumed. After that, the organic layer was separated out, dried with anhydrous sodium sulfate and concentrated under reduced pressure to give 4,6-dibromo-2,3-dihydrobenzofuran-7-amine (15.73 g, 83.4% yield) as a white solid.

Example 2: Synthesis of 4,6-dibromo-2,3-dihydrobenzofuran-7-amine 5 g of 2,3-dihydrobenzofuran-7-amine and 100 mL of N, N-dimethylformamide were added to a 100 mL of reaction flask, and cooled down to a temperature between −5° C. and 0° C., followed by dropwise adding 13.17 g of N-bromosuccinimide in batches and reaction under stirring for 30 minutes, in which the N-bromosuccinimide as a solid has the advantages of being calculated and controlled easily while bromine is a corrosive liquid, irritating and inconvenient to be weighed and used. After that, the reaction solution was added to 200 mL of water, and extracted with ethyl acetate twice. The organic phases were combined, washed with 10% sodium hydroxide solution, dried with anhydrous sodium sulfate and concentrated under reduced pressure to give 4,6-dibromo-2,3-dihydrobenzofuran-7-amine (8.47 g, 78.2% yield).

Example 3: Synthesis of 4,6-dibromo-7-chloro-2,3-dihydrobenzofuran

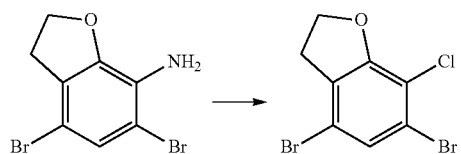 [SMILES: Nc1c(Br)cc(Br)c2c1OCC2 ; Clc1c(Br)cc(Br)c2c1OCC2]

10 g of 4,6-dibromo-2,3-dihydrobenzofuran-7-amine and 50 mL of concentrated hydrochloric acid were added to a 250 mL of reaction flask, cooled down to 0° C. to 5° C., and a solution of 2.47 g sodium nitrite in 8 mL water was dropwise added under a kept temperature. After the completion of the dropwise addition, the system was reacted for 30 minutes under the kept temperature, and then 6.76 g of cuprous chloride was added in batches, warmed to a room temperature and reacted for 2 hours. After that, ethyl acetate was added for extraction, the organic layer was washed with 5% sodium hydroxide solution, and concentrated to obtain a crude product, which was subjected to silica gel column chromatography to give 4,6-dibromo-7-chloro-2,3-dihydrobenzofuran (9.01 g, 84.5% yield) as a white solid.

Example 4: Synthesis of 4,6-dibromo-7-chloro-2,3-dihydrobenzofuran 10 g of 4,6-dibromo-2,3-dihydrobenzofuran-7-amine, 100 mL of acetonitrile and 9.18 g of cupric chloride were added to a 250 mL of reaction flask, heated to a temperature to 50° C., and 8.0 g of isoamyl nitrite was dropwise added. After the completion of dropwise addition, the system was reacted for 30 minutes under the kept temperature. After that, the system was cooled down to a room temperature and concentrated to remove the solvent, followed by adding ethyl acetate and filtration. The filtrate solution was washed with 5% sodium hydroxide solution and concentrated to obtain a crude product, which was subjected to silica gel column chromatography to give 4,6-dibromo-7-chloro-2,3-dihydrobenzofuran (8.78 g, 82.3% yield) as a white solid.

Example 5: Synthesis of Compound 1

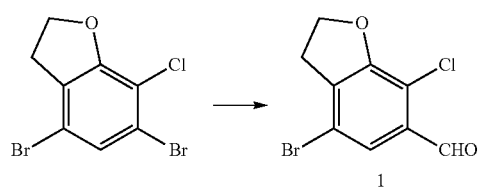 [SMILES: Clc1c(Br)cc(Br)c2c1OCC2 ; O=Cc1cc(Br)c2c(c1Cl)OCC2]

3.5 g of 4,6-dibromo-7-chloro-2,3-dihydrobenzofuran and 35 mL of tetrahydrofuran were added to a 100 mL of reaction flask. 18 mL of solution of 2.5 M isopropyl magnesium chloride in tetrahydrofuran was dropwise added under nitrogen protection. After the completion of dropwise addition, the system was stirred for 1 hour under a kept temperature. 5 mL of N, N-dimethylformamide was dropwise added under the kept temperature, and then hold at the kept temperature for reaction for 30 minutes. After that, the reaction solution was added to 3 M of hydrochloric acid and extracted with ethyl acetate. The organic layer was dried with anhydrous sodium sulfate, concentrated and subjected to column chromatography to give compound 1 (2.73 g, 93.2% yield) as a white solid.

Example 6: Synthesis of Compound 2

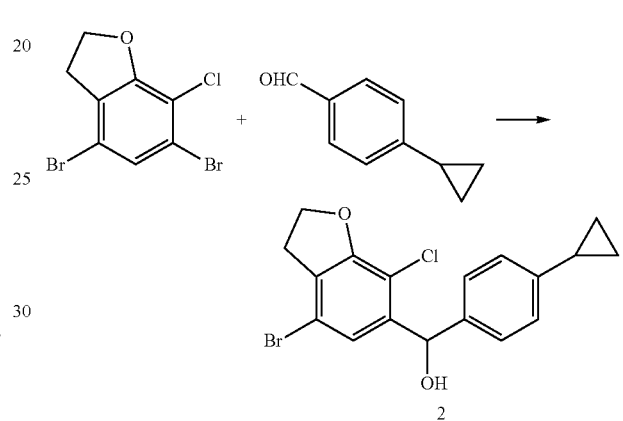

3.5 g of 4,6-dibromo-7-chloro-2,3-dihydrobenzofuran and 35 mL of tetrahydrofuran were added to a 100 mL of reaction flask, cooled down to −30° C. under nitrogen protection. 2.25 mL solution of 2.5 M isopropyl magnesium chloride in tetrahydrofuran was added dropwise, followed by dropwise adding 4.6 mL solution of 2.5 M n-butyllithium in n-hexane. After the completion of the dropwise addition, the system was stirred for 30 minutes under a kept temperature, and then 10 mL solution of 1.96 g 4-cyclopropyl benzaldehyde in tetrahydrofuran was added under the kept temperature. After the completion of dropwise addition, the system was reacted for 30 minutes under the kept temperature. The reaction solution was then added to 3 M of hydrochloric acid and extracted with ethyl acetate. The organic layer was dried with anhydrous sodium sulfate, concentrated and subjected to column chromatography to give compound 2 (3.70 g, 86.9% yield).

The invention claimed is:
1. A method for preparing compound 1 and compound 2 having a structure as shown below, wherein the method comprises the following steps:

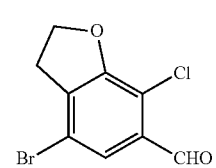

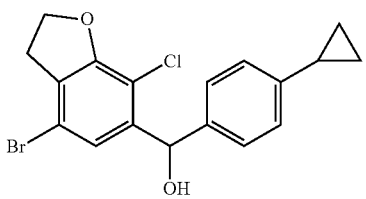

2

1) subjecting 2,3-dihydrobenzofuran-7-amine as a raw material to a selective-dibromination with a brominating reagent to obtain 4,6-dibromo-2,3-dihydrobenzofuran-7-amine;
2) subjecting 4,6-dibromo-2,3-dihydrobenzofuran-7-amine obtained in the step 1) to Sandmeyer reaction for chlorination to obtain 4,6-dibromo-7-chloro-2,3-dihydrobenzofuran;
3-1) selectively debrominating from 4,6-dibromo-7-chloro-2,3-dihydrobenzofuran obtained in the step 2) using a strong base, and then adding a formylation reagent to obtain compound 1; and
3-2) selectively debrominating from 4,6-dibromo-7-chloro-2,3-dihydrobenzofuran obtained in the step 2) using a strong base, and then reacting with 4-cyclopropyl benzaldehyde to obtain compound 2.

2. The method according to claim 1, wherein in the step 1), the brominating reagent is at least one of bromine, N-bromosuccinimide (NBS), and dibromohydantoin.

3. The method according to claim 1, wherein the selective-dibromination is carried out at a reaction temperature in a range from 10° C. to 20° C.

4. The method according to claim 1, wherein in the step 2), a reagent used in the Sandmeyer reaction is at least one of hydrochloric acid/sodium nitrite/cuprous chloride system, isoamyl nitrite ester/cupric chloride system, and t-butyl nitrite/cupric chloride system.

5. The method according to claim 1, wherein in the step 3-1), the strong base is at least one of n-butyllithium, tert-butyllithium, and isopropylmagnesium chloride.

6. The method according to claim 1, wherein in the step 3-1), the formylation reagent is one of N,N-dimethylformamide, N-formylmorpholine, and ethyl formate.

7. The method according to claim 1, wherein in the step 3-2), the strong base is at least one of n-butyllithium, tert-butyllithium, and isopropylmagnesium chloride.

8. The method according to claim 2, wherein the step 1) comprises: filtering after the dibromination, adding the filter cake to a mixed solvent of water and ethyl acetate, followed by sodium hydroxide solution dropwise to adjust pH in a range from 8 to 10, separating and drying the organic layer over anhydrous sodium sulfate, and concentrating the residue under reduced pressure to obtain 4,6-dibromo-2,3-dihydrobenzofuran-7-amine.

9. The method according to claim 4, wherein the step 2) comprises: adding 4,6-dibromo-2,3-dihydrobenzofuran-7-amine and concentrated hydrochloric acid to a reaction flask and cooling down to a temperature of 0-5° C.; adding sodium nitrite solution dropwise while maintaining at a constant temperature; after the dropwise addition, reacting for 20-60 minutes while maintaining at a constant temperature; then adding cuprous chloride in batches and reacting for 1-3 hours at room temperature; extracting with ethyl acetate, washing the organic layer with sodium hydroxide solution and concentrating to obtain a crude product; and separating and purifying the crude product to obtain 4,6-dibromo-7-chloro-2,3-dihydrobenzofuran.

10. The method according to claim 4, wherein the step 3-1) comprises: to a reaction flask, adding 4,6-dibromo-7-chloro-2,3-dihydrobenzofuran and tetrahydrofuran, followed by isopropylmagnesium chloride in tetrahydrofuran dropwise under nitrogen protection; after the dropwise addition, stirring for 0.5-1.5 hours while maintaining at a constant temperature; then adding N,N-dimethylformamide dropwise while maintaining at a constant temperature, and continuing to react for 20-60 minutes while maintaining at a constant temperature; pouring the reaction solution into hydrochloric acid, extracting with ethyl acetate, drying the organic layer over anhydrous sodium sulfate; and concentrating and separating to obtain compound 1.

11. The method according to claim 7, wherein the step 3-2) comprises: adding 4,6-dibromo-7-chloro-2,3-dihydrobenzofuran and tetrahydrofuran to a reaction flask, cooling down to −30° C. under nitrogen protection; adding isopropyl magnesium chloride in tetrahydrofuran dropwise, followed by n-butyllithium in n-hexane dropwise; after the dropwise addition, stirring for 20-60 minutes while maintaining at a constant temperature; then adding 4-cyclopropylbenzaldehyde in tetrahydrofuran dropwise while maintaining at a constant temperature; after the dropwise addition, continuing to react for 20-60 minutes while maintaining at a constant temperature; pouring the reaction solution into hydrochloric acid, extracting with ethyl acetate, and drying the organic layer over anhydrous sodium sulfate; and concentrating, separating and purifying to obtain compound 2.

* * * * *